United States Patent
Matsumoto et al.

(10) Patent No.: US 6,813,548 B2
(45) Date of Patent: Nov. 2, 2004

(54) SELF-TRAVELING VEHICLE

(75) Inventors: Kazuhisa Matsumoto, Kakogawa (JP); Setsuji Yamaguchi, Himeji (JP); Yukifumi Yamaguchi, Himeji (JP); Hirofumi Mitsueda, Nishiwaki (JP); Kouji Moriyama, Miki (JP); Kazuhiro Matsuoka, Kasai (JP)

(73) Assignee: Sanyo Electric Co., Ltd., Moriguchi (JP)

(*) Notice: Subject to any disclaimer, the term of this patent is extended or adjusted under 35 U.S.C. 154(b) by 53 days.

(21) Appl. No.: 10/370,521

(22) Filed: Feb. 24, 2003

(65) Prior Publication Data

US 2003/0163252 A1 Aug. 28, 2003

(30) Foreign Application Priority Data

Feb. 27, 2002 (JP) .................................. 2002-052031

(51) Int. Cl.[7] .............................................. G01C 22/00
(52) U.S. Cl. ........................... 701/25; 701/26; 701/209; 701/213
(58) Field of Search ............................... 701/25, 24, 23, 701/26, 213, 50, 209, 117, 208; 340/988, 989, 937; 368/586, 587; 342/357.13, 357.17

(56) References Cited

U.S. PATENT DOCUMENTS

| | | | | |
|---|---|---|---|---|
| 5,684,696 A | * | 11/1997 | Rao et al. ....................... | 701/25 |
| 5,956,250 A | * | 9/1999 | Gudat et al. ................... | 701/50 |
| 6,199,000 B1 | * | 3/2001 | Keller et al. ................... | 701/50 |
| 6,484,078 B1 | * | 11/2002 | Kageyama .................... | 701/25 |
| 6,553,299 B1 | * | 4/2003 | Keller et al. ................... | 701/50 |

FOREIGN PATENT DOCUMENTS

JP   2000-148245   5/2000

* cited by examiner

Primary Examiner—Richard M. Camby
(74) Attorney, Agent, or Firm—Armstrong, Kratz, Quintos, Hanson & Brooks, LLP (57) ABSTRACT

A self-traveling vehicle without requiring guide wire for travel is provided which allows a change of a traveling course with little expense and labor for reconstruction. Such self-traveling vehicle comprises a storing means for storing a travel road to be traveled, a receiving means for receiving a signal from a satellite and a calculating means for calculating a current positional information based on the signals from the satellite. A controlling circuit for controlling the traveling drive and steering wheel drive provided in the vehicle controls the vehicle in such a manner as to travel on a predetermined set road by verifying the current positional information and the road to be traveled.

12 Claims, 9 Drawing Sheets

SELF-TRAVELING VEHICLE

BACKGROUND OF THE INVENTION

The present invention relates to a self-traveling vehicle which can travel by itself without guide wire or cable, based on positional information detecting a current position and map information indicating a traveling road or path.

Previously, there is described in Japanese Unexamined Patent Publication No. 148245/2000 a caddie cart which can travel along the pre-determined road by detecting magnetic field from the guide wire buried in surface along the road.

However, there are problems in the above-mentioned cart system. In a facility (e.g., golf course) where such a self-traveling vehicle travels, the system necessarily requires a construction of the guide lane such as guide wire. It results in a cost increase. Further, when a traveling course is to be changed, the system requires also a change of the course of the guide wire buried in road surface. It takes labor and expense so that such change of the traveling course is not easy.

The present invention is carried out for solving the above problems. An object of the present invention is to provide a self-traveling vehicle without requiring guide wire for travel, accordingly it is possible to change a course easily without expense or labor of the construction. Another object of the present invention is to provide a self-traveling vehicle which is safe and convenient to user.

SUMMARY OF THE INVENTION

In order to achieve the above-mentioned object of the present invention, it is preferable that a self-traveling vehicle comprises a traveling drive circuit for driving a drive source, a steering wheel drive circuit for operating a steering wheel and a receiving means for receiving signals of positional information from a satellite, wherein said self-traveling vehicle comprising, a calculating means for calculating current positional information based on the signals transmitted from the receiving means;

a storing means for storing a traveling road to be traveled, which is set beforehand;

a controlling circuit for controlling the traveling drive circuit and the steering wheel driving circuit in such a manner as to travel on a predetermined set road by verifying the current positional information calculated by the calculating means and the road to be traveled stored in the storing means.

More preferably, traveling directions to be traveled on said traveling road and a layout of a golf course are stored in said storing means.

More preferably, an information of said traveling road and a positional information calculated by said calculating means, both of which are stored in said storing means are displayed on a display.

More preferably, the self-traveling vehicle further comprises a braking means for braking a movement generated by said drive source and a detecting means for detecting a direction in which the self-traveling vehicle travels, said movement is braked by said braking means when the self-traveling vehicle travels in a direction opposite to a stored direction stored in said storing means after said direction is detected by the detecting means.

More preferably, said detecting means calculates a deviation departed from said stored direction based on a position of the self-traveling vehicle within a predetermined time period.

More preferably, said direction in which the self-traveling vehicle travels is detected by the detecting means using a traveling locus.

More preferably, the self-traveling vehicle further comprises a detecting means for detecting a direction in which the self-traveling vehicle travels and a steering direction detecting means for detecting a direction in which said steering wheel is operated, wherein said positional information is prepared after failing to detect a positional signal to be transmitted from the detecting means and the steering direction detecting means if the positional information is not received by the receiving means, whereby the self-traveling vehicle travels based on the prepared positional information and the traveling road stored in the storing means.

More preferably, the self-traveling vehicle further comprises a velocity detecting means for detecting a velocity of the self-traveling vehicle;

wherein the more said velocity increases, the more a frequency of reading said positional information from said calculating means implemented by the controlling circuit within a predetermined time period increases.

More preferably, the controlling circuit operates the steering wheel driving circuit using a forward position having a predetermined distance calculated by the calculating means as a target.

More preferably, said controlling circuit operates the steering wheel driving circuit using said forward position, wherein the more velocity increases, the farther said forward position is used as a target.

According to the above-mentioned structure, a self-traveling vehicle travels by driving a driving source through controlling a traveling drive circuit and at the same time by determining a travel direction through steering a steering wheel by controlling a steering wheel drive circuit. Further, the self-traveling vehicle receives positional information from a satellite by a receiving means (receiver), calculates a current position by means of calculating positional information, and deduces a current position of the vehicle on the map through combining the positional information with means of storing travel road. Then, a travel direction is calculated by collating the travel road in means of storing travel road with positional information, to control the traveling drive circuit and steering wheel drive circuit so as to travel according to the travel direction in means of storing travel road. Thus, a self-traveling vehicle travels in an indicated direction by subsequently collating the positional information by means of calculating positional information with travel road by means of storing travel road.

Further, in addition to a travel road, a layout of a golf course is stored in means of storing travel road, thereby, such self-traveling vehicle can travel along the golf course. Such information is displayed in a display screen such as LCD provided in the self-traveling vehicle, which can show players the current traveling position in a golf course.

Furthermore, when by means of calculating positional information, a current travel direction is determined to be opposite to the direction stored in means of storing travel road, a drive to drive means for traveling is stopped and travel is stopped by braking means. Thus dangerous travel can be stopped. One method to determine to be the opposite direction is to compare travel positions between the predetermined time interval and to determine the travel direction. If travel direction is opposite to what is predetermined, the vehicle is decided to travel backward and stopped. Other method to determine to be the opposite direction is to compare the locus of travel and the current direction of the travel and to calculate the direction relative to that stored in means of storing travel road so that whether the direction is forth or opposite is decided.

Further, when a receiver cannot receive a satellite signal due to a poor condition for receiving electromagnetic wave or a signal line breakage while traveling by means of calculating positional information and means of storing travel road, the current position can be obtained by calculating a virtual position after disappearance of the signal with use of means of detecting direction which detects travel direction of encoder or the like and use of steering direction detecting means which detects steering direction of the steering wheel. By these methods, a current position is assumable even if signal from a satellite can not be received and the current position becomes unclear. Thus, the vehicle can continue to travel without stop.

When a vehicle travels by means of calculating positional information and means of storing travel road, the more velocity of the self-traveling vehicle increases, the more frequently the calculating of the positional information is made within a predetermined time, thereby the vehicle can quickly decide the current position and never runs over the travel road stored in means of storing travel road.

Furthermore, in traveling, the vehicle can travel along the travel road by steering, with use of a forward position having a predetermined distance calculated by the calculating means as a target.

And, since the more the velocity of the self-traveling vehicle increases, the farther the forward position is used as a target for driving the steering wheel drive circuit, the vehicle never runs over the travel course even at a high speed.

In order to achieve the above-mentioned object of the present invention, it is preferable that said controlling circuit stops driving said drive source, when a signal from said receiving means is not received.

More preferably, there are switchably provided a self-traveling mode in which the vehicle travels through said controlling circuit and a manual-traveling mode in which the vehicle travels with steering wheels manually operated by an user, wherein said controlling circuit switches to a manual-traveling mode if a signal from said receiving means is not received.

More preferably, there is provided a display indicating whether a signal from said receiving means is received or not.

More preferably, there is provided a display indicating a current traveling mode in which said vehicle travels.

More preferably, there is provided a display indicating whether a signal from said receiving means is received or not and a current traveling mode, wherein if a signal from said receiving means is not received, the display shows that a signal from said receiving means is not received, then if a signal form said receiving means is received the display shows that a signal form said receiving means is received and that a switch to self-traveling mode is possible.

More preferably, said display that a switch to self-traveling mode is possible is indicated only when said vehicle is on the pre-determined road.

According to the above-mentioned structure, when positional signal cannot be received due to bad condition for receiving electromagnetic wave or a signal from receiver cannot be received due to a signal line breakage while traveling, the vehicle is controlled to stop travel. By such control, the vehicle does not run off the traveling road uncontrollably, which improves safety.

Further, when positional signal cannot be received due to bad condition for receiving electromagnetic wave or a signal from receiver cannot be received due to a signal line breakage while traveling, the vehicle is stopped and changed from self-traveling mode to manual-traveling mode. By such control, the vehicle does not run off the traveling road uncontrollably, and users can drive the vehicle in manual mode. Thus, because the vehicle is once stopped and then changed to manual-traveling mode when a receiver can not receive the signal, a safe self-traveling vehicle is realized.

Further, because a presence or absence of the signal from receiver is indicated in a display part, a user can decide whether self-traveling mode is available and convenient vehicle is realized.

Furthermore, because current traveling mode, either self-traveling mode or manual-traveling mode is indicated in a display part, a convenient vehicle is realized.

Moreover, when the signal from the receiver disappears, a message that the signal from the receiver disappears is indicated in a display part, and then in traveling in manual mode, when the signal from the receiver is input, namely reception of positional signal from a satellite is restored, a message that the signal from the receiver is input and an message that a change to self-traveling mode is available are indicated in a display part. Accordingly, a convenient self-traveling vehicle is realized.

Further, a message that a change to self-traveling mode is available is indicated only when the vehicle is on the predetermined traveling road. Therefore, when a change to self-traveling mode is done, the vehicle can travel on the road as it is, and a change of traveling mode can be made smoothly.

DETAILED DESCRIPTION

An embodiment of a self-traveling vehicle of the present invention will be explained by means of an example of a caddie cart with reference to the drawings.

Figure 1:
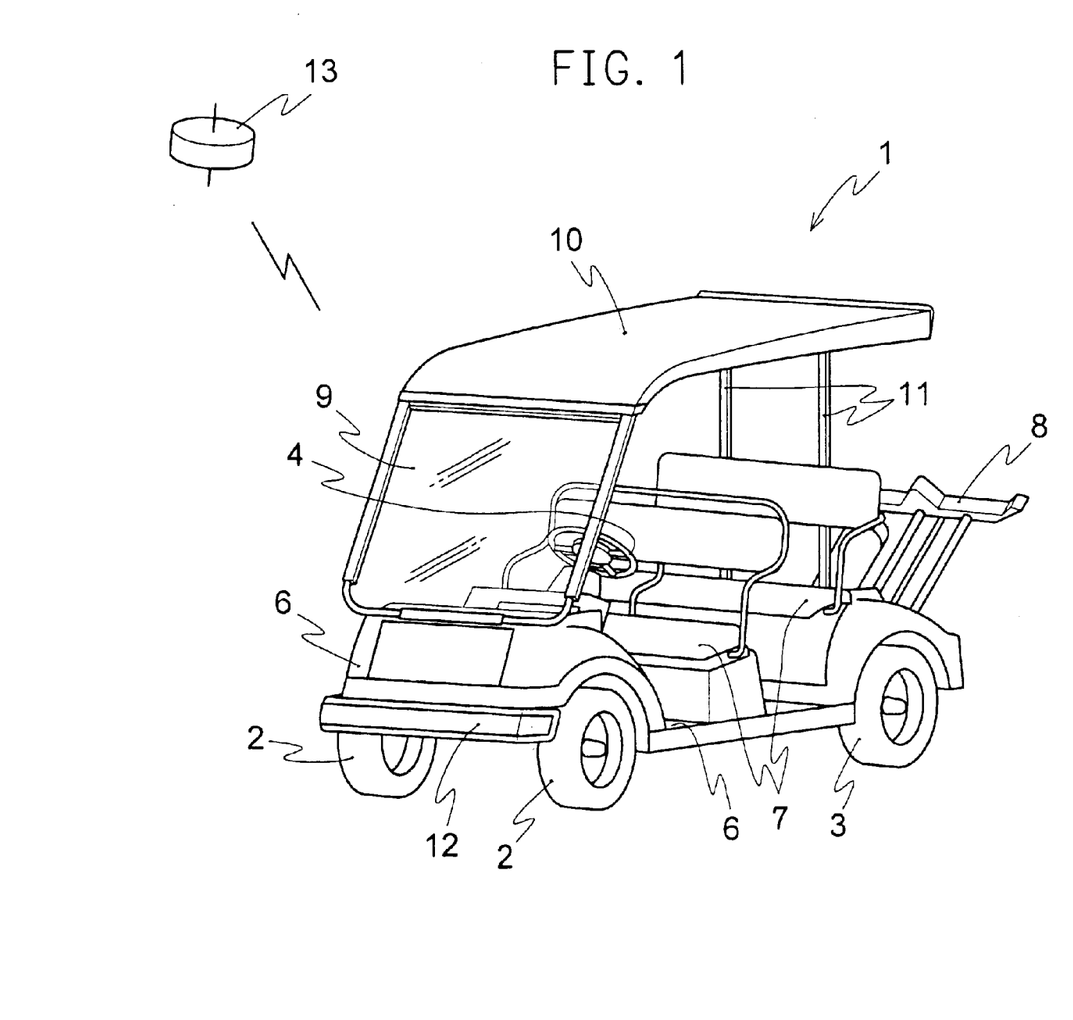
FIG. 1 is a perspective view showing a main body of a caddie cart according to an embodiment of the present invention.
Figure 2:
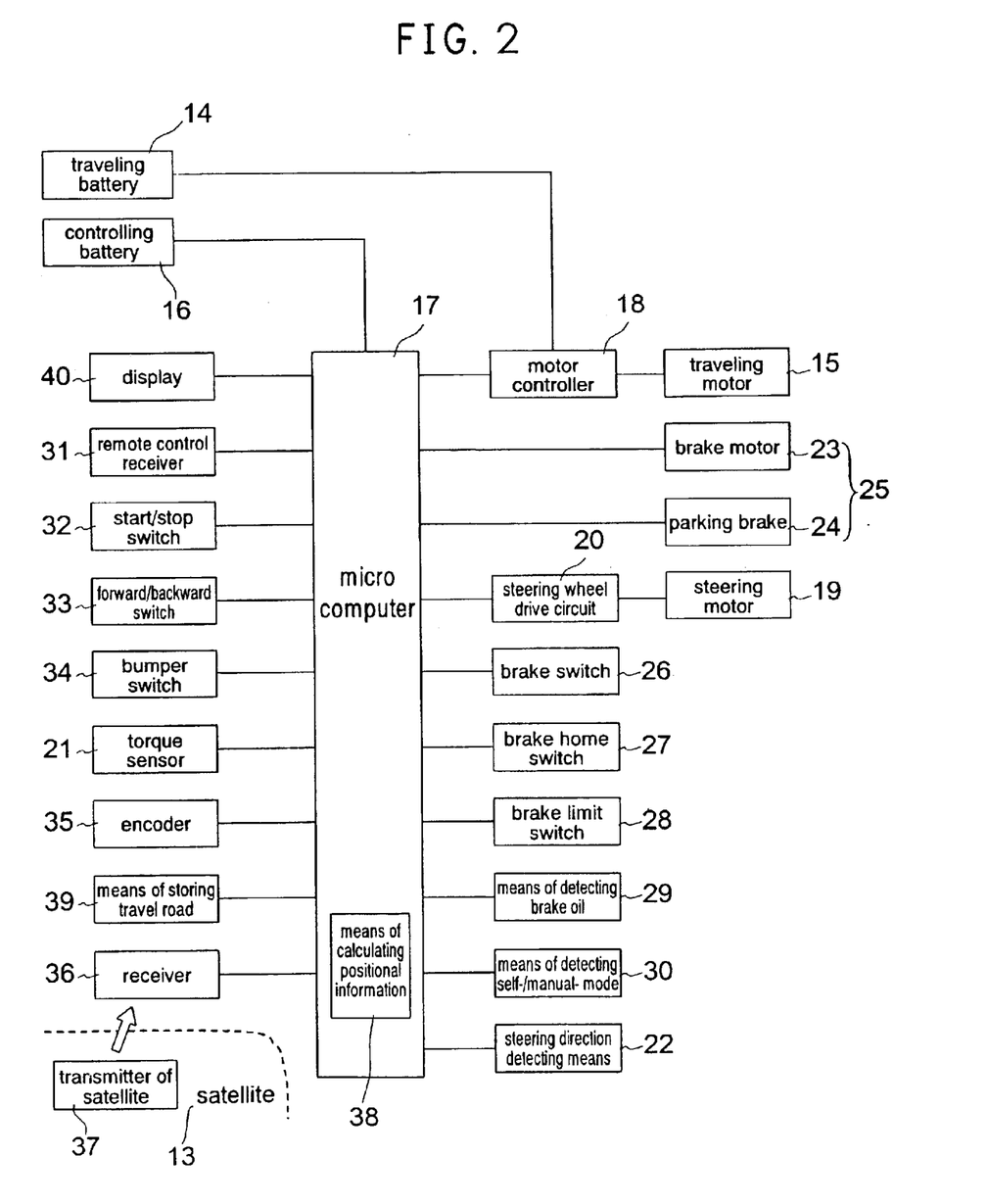
FIG. 2 is a block diagram of a control circuit according to an embodiment of the present invention.

A whole structure of a caddie cart and a block diagram of a control circuit of the caddie cart are explained with reference to FIG. 1 and FIG. 2. At first, a whole structure of a caddie cart is explained with reference to FIG. 1.

Reference numeral 1 indicates a main body of a motor-driven caddie cart, which uses an electric motor as a drive source. The main body 1 of a caddie cart is equipped with front wheels 2 for steering and rear wheels 3 as driving wheels. The main body 1 of a caddie cart has both manual-traveling mode where a user steers the front wheels 2 with a handle 4 and self-traveling mode where the front wheels are automatically steered along a travel road stored in a means of storing a travel road 39, described later, and can travel in desired mode by user's selection.

The front wheels 2 and rear wheels 3 are mounted in a mainframe 5 of the main body 1, and the mainframe 5 is covered with main hood 6 made of organic materials.

Front and rear sheets 7 are provided in the mainframe 5, and two users can sit sidewise in each sheet. A handle 4 is provided in front of the front sheet. In the manual-traveling mode, a user can steer the front wheels 2 by operating the handle 4. The handle 4 is inserted into a handle post which is fixed obliquely to the front part of the main body 1 to support the handle, so that the handle 4 is rotatably attached.

A golf bag container 8 which can receive golf bags obliquely, is provided in rear side of the main body 1.

A front shield 9 made of transparent plastics is provided in front side of the main body 1 and a roof 10 which covers an whole upper area of the sheets 7 is provided, continuously extending from the front shield 9.

Stays 11 are provided in rear side supporting the roof 10.

A bumper 12 provided in front side of the main body 1, has a switch (not shown) in order to stop the traveling cart when the cart collides with obstacles.

The main body 1 can measure the own current position by receiving a signal of positional information form a satellite 13. The cart is generally equipped with so-called GPS (Global Positioning System).

Next, control circuit is explained with reference to FIG. 2.

Six traveling batteries 14 are mounted in a cart width direction on main frame 6. Electric voltage of each battery is 12 V. The traveling batteries 14 are connected so that a voltage of 72 V obtained by the 6 batteries connected in series can be applied to the driving motor 15.

Controlling battery 16 is a power source for a control circuit which controls a travel of the main body 1. Electric voltage of the battery 16 is 12 V and is decreased to 5 V for controlling a microcomputer 17 or the like described later.

A microcomputer 17 (hereafter referred to as "MC") is for controlling a travel such as driving, steering and braking.

A motor controller 18 is a traveling drive circuit which uses the traveling battery 14 as a power source, and drives the traveling motor 15 as a drive source on a basis of switched PWM signal from the MC 17. The motor controller 18 comprises switching elements such as TFT. In self-traveling mode, PWM signal is outputted from the MC 17 to travel at a predetermined velocity. In manual-traveling mode, PWM signal is outputted so that the cart travels at speeds corresponding to displacements of a throttle pedal (not shown) which a user operates.

A steering motor 19 is for steering the front wheels 2 and is controlled by PWM signal from a steering wheel drive circuit 20. Steering to right or left direction (in other words, in clockwise or counter-clockwise) is carried out by rotating the steering motor 19 in normal or reverse direction from a predetermined reference point. The steering motor 19 works not only in self-traveling mode but also in manual-traveling mode. The steering motor in manual-traveling mode works with less force than in self-traveling mode so that the motor serves as an assistant to the handle operation. That means, in manual-traveling mode, force for handle operation is detected by a torque sensor 21 and the steering motor 19 is controlled, corresponding to the detected torque, thereby a user can operate the handle 4 with light force.

An steering direction detecting means 22 is a means of detecting a direction of steering motor which detects how much degree the steering motor 19 rotates to the left or right direction from the predetermined reference point. In the steering direction detecting means for detecting steering motor 22, rotation of the steering motor 19 is detected by a gear provided in a coupled manner to the output axis of the steering motor and calculated by a potentiometer or the like. The data obtained from the steering direction detecting means are stored in memory of the MC 17.

A brake motor 23 is a component for operating disk brakes (not shown) provided at the front and rear wheels and by working the brake motor 23, the brake is actuated for the cart to decrease the traveling velocity or stop.

A parking brake 24 is a component for stopping a rotation of the rear wheel 3 by fixing a rotation of the gear in a gear box (not shown) provided in a transmission portion between traveling motor 15 and rear wheel 3. The parking brake 24 works for braking the cart when traveling velocity is close to zero and below a predetermined value, namely the cart is in the stop condition.

The above-mentioned disk brakes due to brake motor 23 and parking brake 24 together are referred to as braking means 25 as a general term. Alternatively, drum brake, which uses frictional force between brake shoe and brake drum, can be adopted as a braking means.

A brake switch 26 located near a brake pedal (not shown) in the main body 1 works when a user operates the brake pedal. When such operation is detected, a signal is transmitted to the MC 17 to activate the brake motor 23 for braking.

A brake home switch 27 is a switch located near the brake motor 23 for detecting the brake motor being at reference position. The brake home switch 27 detects a position of the brake motor 23 when brake force is not applied. A brake limit switch 28 is a switch for detecting a position of brake motor 23 when a maximum brake force is applied.

A means of detecting brake oil 29 is a component for detecting a quantity of oil in a hydraulic cylinder which activates the disk brake. Means of detecting brake oil 29 alarms when oil decreases and controls MC 27 so as to output a signal to activate the braking means 25 for stopping the main body 1 when oil further decreases.

A means of detecting self/manual mode 30 is a component for detecting a travel mode selected by a user. Means of detecting self/manual mode 30 outputs a signal concerning a travel mode selected by a user to MC 17, to control travel based on the selected mode.

A remote control receiver 31 is a component for starting or stopping the main body 1 by remote controlling with a remote control transmitter (not shown). The remote control receiver 31 works so that the main body starts travel when a signal from the remote control transmitter is received in a halt condition and stops travel when a signal from the remote control transmitter is received in a travel condition.

A start/stop switch 32 provided near the handle 4 is a switch for starting or stopping the main body 1 when a user is on board in a self-traveling mode.

A forward/backward switch 33 is a switch with which a user selects either direction, forward or backward in manual-traveling mode. Similar to the star/stop switch 32, the forward/backward switch 33 is provided near the handle 4.

A bumper switch 34 is a component for detecting a contact of an obstacle to the bumper 12. The bumper switch 34 turns on by detecting an obstacle to send a signal. to the MC 17. Then, a signal is sent from the MC 17 to a braking means 25 so that the braking means works.

An encoder 35 is a component for detecting rotating direction of the rear wheels 3, that is, travel direction and rotation speed of the rear wheels 3, that is, traveling velocity. The encoder 35 outputs a detected signal to the MC 17. According to the signal, the MC 17 outputs a control signal so that traveling velocity is equal to the indicated velocity. That is, the encoder 35 plays a role of a detecting means for detecting a travel direction and a velocity detecting means for detecting a travel velocity. In the detecting means for detecting a travel direction, the signal from the encoder 35 is used for decision whether the cart travels in a normal direction or a reverse direction.

A receiving means (receiver) 36 provided in the main body 1 receives a signal from a transmitter 37 of a satellite 13. The receiver 36 receives the signal at any required time and transmits it to the MC 17. With use of the data, current position of the main body 1 is calculated by the means of calculating positional information 38 in the MC 17. The means of calculating positional information 38 has a circuit which transforms the data from the satellite 13 to the positional information.

The travel road and a layout of a golf-course are inputted in advance and stored in a storing means for storing travel road to be traveled 39. For example, the means of storing travel road 39 is preferably in a form of storage disc such as CD-ROM (compact disc) or DVD (digital versatile disc), which stores travel course, travel directions of the main body 1, velocities at which the main body 1 travels, and positions which the main body 1 stops. In this case, the MC 17 reads such information at any required time from such disc through a disk drive provided in the main body 1.

A display part 40 indicates a layout of golf course stored in the means of storing travel road 39, current position of the main body 1, alarm indication, current traveling mode and the like. The display part 40 consists of a liquid crystal display or the like.

According to the above-mentioned structure, a self-traveling cart travels by driving a driving source 15 through controlling a traveling drive circuit 18 and at the same time by determining a travel direction through steering a steering wheels by controlling a steering wheel drive circuit 20. Further, the self-traveling cart receives positional information from a satellite 13, calculates a current position by means of calculating positional information 38, and deduces a current position of the cart on the map through combining the positional information with the means of storing travel road 39. Then, a travel direction is calculated by verifying the travel road in the means of storing travel road 39 and positional information, thereby the traveling drive circuit 18 and steering wheel drive circuit 20 are controlled so that the caddie cart can travel according to the travel direction in the means of storing travel road 39. Thus, a self-traveling cart travels in an indicated direction by subsequently verifying the positional information by the means of calculating positional information 38 and travel road by the means of storing travel road 39.

Figure 4:
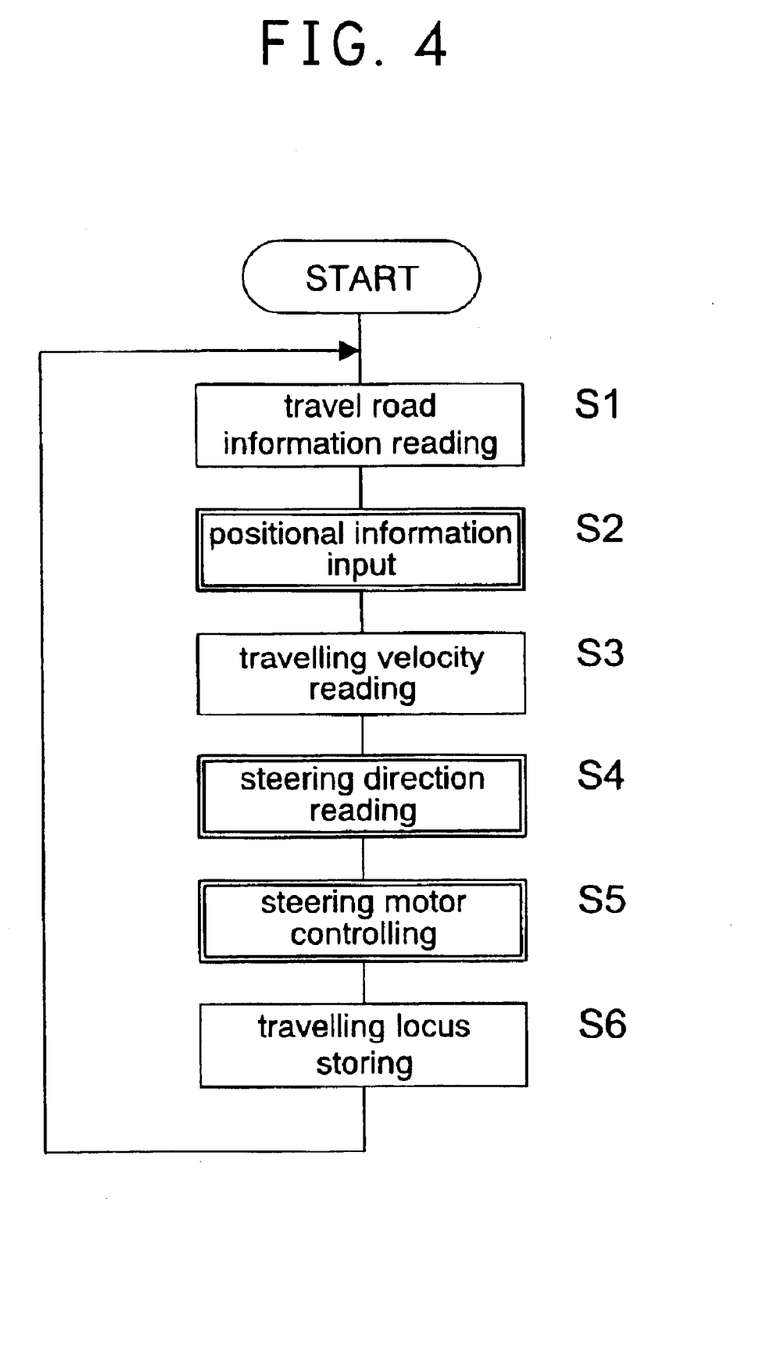
FIG. 4 is a flowchart showing traveling control in a case where self-traveling mode is selected according to an embodiment of the present invention.

In FIG. 4, shows a flowchart of drive control in a self-traveling mode. Travel road information is read (S1) before starting travel. When traveling, positional information is inputted with using a signal from a satellite (S2). Also, travel velocity is read with a means of detecting travel velocity 35 (S3) and steering direction is read with means of detecting steering 22 (S4). Based on the above information, steering motor 19 is controlled to travel (S5). Locus of travel is stored in a memory (S6).

Figure 5:
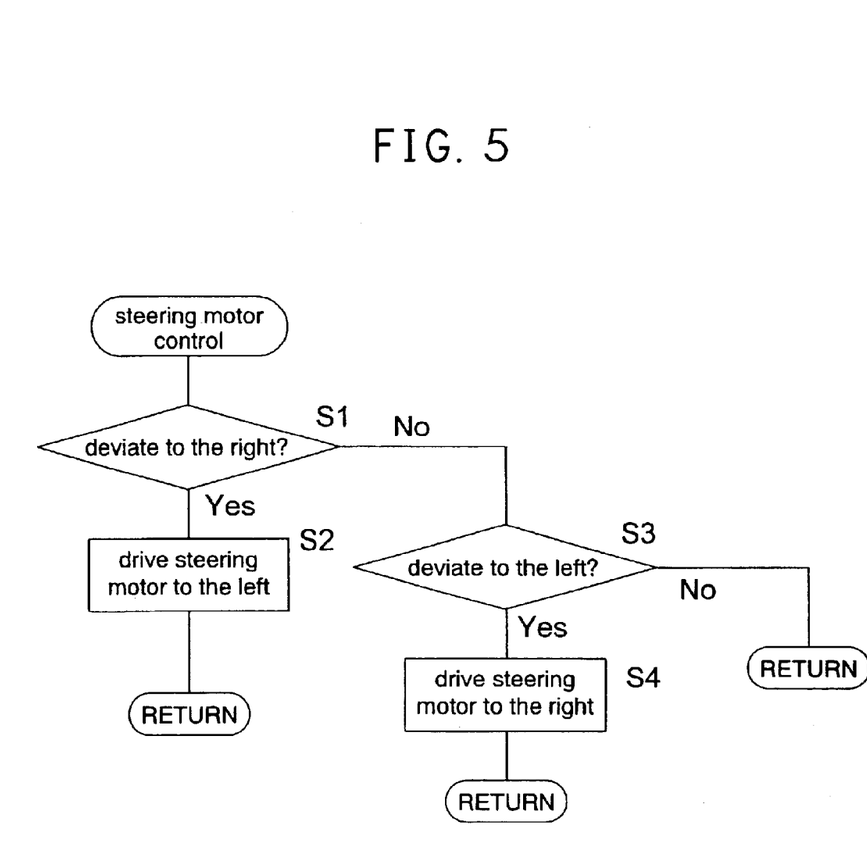
FIG. 5 is a flowchart showing control of a steering motor in a case where self-traveling mode is selected according to an embodiment of the present invention.

In FIG. 5 shows a flowchart of drive steering control in a self-traveling mode. Deviation of steering is detected by a means of detecting steering 22 (S1). If steering deviates to the right, the steering motor 19 is driven to the left (S2) and, if steering deviates to the right, it is driven to the left (S3). Thus, steering motor 19 is controlled so as to prevent from deviation.

When a caddie cart travels by a means of calculating positional information 38 and a means of storing travel road 39, the more velocity of the self-traveling cart increases, the more frequently the calculating of the positional information is made within a predetermined time, thereby the cart can quickly decide the current position and never runs over the travel road, the positional data of which are stored in the means of storing travel road 39.

Furthermore, in traveling, the cart can travel along the travel road by steering, with use of a forward position having a predetermined distance calculated by the calculating means as a target.

And, since the more the velocity of the self-traveling cart increases, the farther the forward position is used as a target for driving the steering wheel drive circuit 20, the cart never runs over the travel course even at a high velocity.

Further, in addition to a travel road, a layout of a golf course is stored in the means of storing travel road 39, thereby, such self-traveling cart can travel along the golf course. Such information is displayed in a display screen 40 such as LCD provided in the self-traveling cart, which can show players the current traveling position in a golf course.

Figure 3:
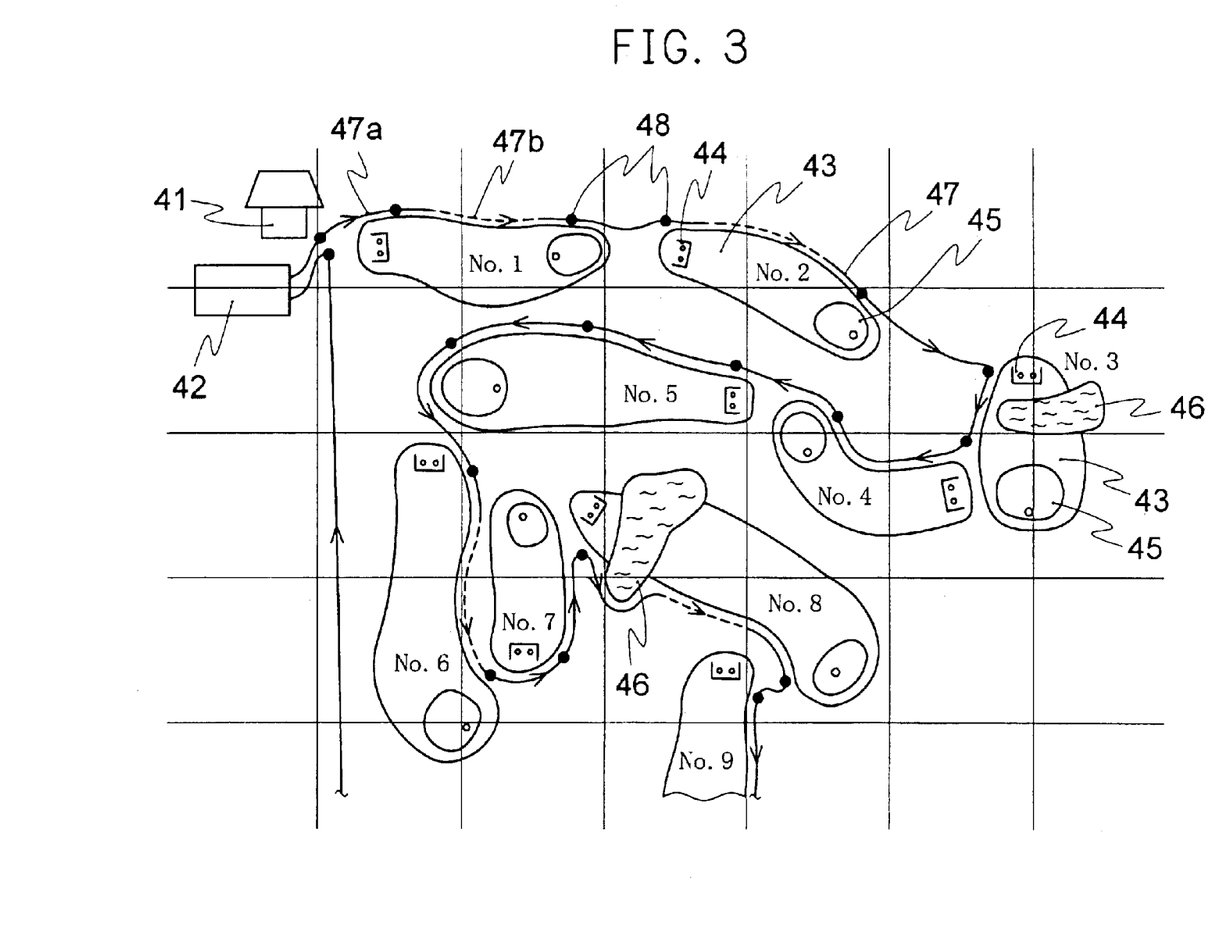
FIG. 3 is a layout of traveling course stored in means of storing travel road according to an embodiment of the present invention.

Next, FIG. 3 shows what is memorized in means of storing travel road 39.

In the travel road information, longitude and latitude data are stored, which are shown as vertical and horizontal lines, respectively in FIG. 3. Further precise longitude and latitude data are stored, which are not shown in FIG. 3.

In this chart, in addition to the longitude and latitude, there are also stored positional data on a golf-course, a clubhouse 41 for reception of golf players and management of traveling of caddie carts, a cart house 42 for storing the caddie carts and a layout of golf course. The stored layout includes golf courses 43 from No. 1 to 18 holes, starting points 44, greens 45 and ponds 46, so that longitude and latitude at every point in the golf course can be figured out.

Further, in the means of storing travel road 39, the travel road 47 along which the main body 1 of the caddie cart travels is stored. The travel road 47 is indicated by a continued line, and a travel direction is indicated by an arrow on the travel road 47 in FIG. 3. Travel velocity of the main body 1 of the caddie cart is also stored in the travel road. In FIG. 3, region indicated by a solid line 47a corresponds to the indicated velocity of 6 km/hr and region indicated by a broken line 47b corresponds to the indicated velocity of 10 km/hr. Moreover, solid circles 48 in the road indicate points where the caddie cart should stop. As shown in FIG. 3, the caddie cart starts from the cart house 42, arriving at a clubhouse 41, reads stop positional information, travel velocity at that point and stop position. Then, according to the information, a drive signal from the MC 17 is outputted to the motor controller 18 to drive the traveling motor 15.

Thus, using GPS information, by controlling the travel direction with the steering motor 19 on the basis of the travel road information, a self-traveling cart can travel without the guide wire buried into the road surface as in the conventional art. Therefore, by such a way, expense for burying the guide wire can be reduced and if the course is to be changed, only necessary thing is to change a travel road data in the means of storing travel road 39, which is simply done.

Further, because a travel is controlled on a basis of the data on velocity and stop positions stored in means of storing travel road 39, a construction of magnet or the like in the prior art becomes unnecessary.

Figure 6:
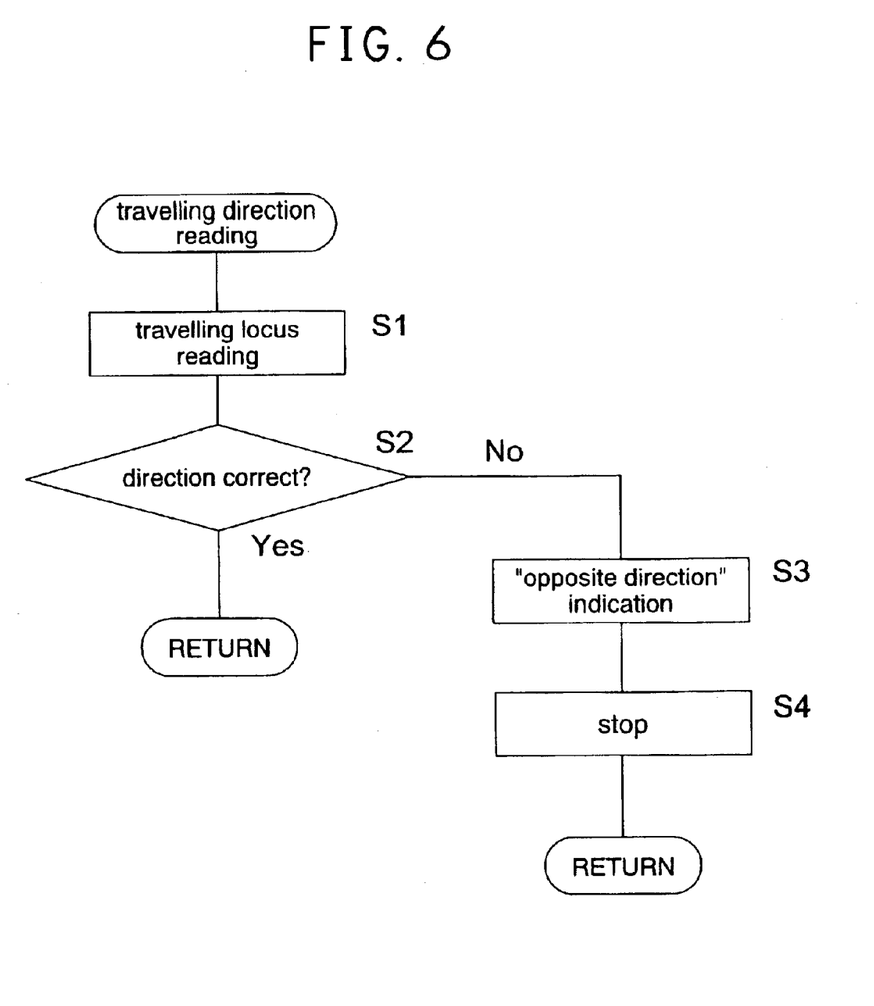
FIG. 6 is a flowchart showing control of traveling direction reading in a case where self-traveling mode is selected according to an embodiment of the present invention.

Hereinafter, with reference to FIGS. 4 and 6, there will be explained for the case in which a cart travels in the reverse direction relative to that stored in travel road.

After reading of information on travel road and travel direction in S1 or S4 shown in FIG. 4, if the MC 17 decides that actual travel direction is different from the direction at which a cart should travel, the MC activates a brake motor 23 to apply the brake, because there is a risk for the cart to collide a following cart, resulting from the opposite travel. Then, a display indicates a message that the cart travels in the opposite direction and prompts a user to change from self-traveling mode to manual-traveling mode, thereby a user changes into manual-traveling mode to turn around the cart to a reverse direction and again the cart travels in self-traveling mode.

The operation in above case will be explained based on a flowchart shown in FIG. 6.

When the MC 17 reads a travel direction from an encoder 35 in S4 as shown in FIG. 4, the MC also read the travel locus stored in the MC 17 (S1) and make decision whether current travel direction is correct or not (S2). Then, if it is correct, the operation follows the flowchart shown in FIG. 4. If decision is made to be the opposite direction, then a display 40 indicates that the cart travels in the opposite direction (S3) and the cart stops by activation of the brake motor 23 and the parking brake 24 (S4).

In above-mentioned example, decision to be the opposite direction is made by reading travel locus. Alternatively, by detecting a plural passing points and the passing times, travel direction can be also detected, thereby, the decision whether the cart travels forward or backward can be made.

Figure 7:
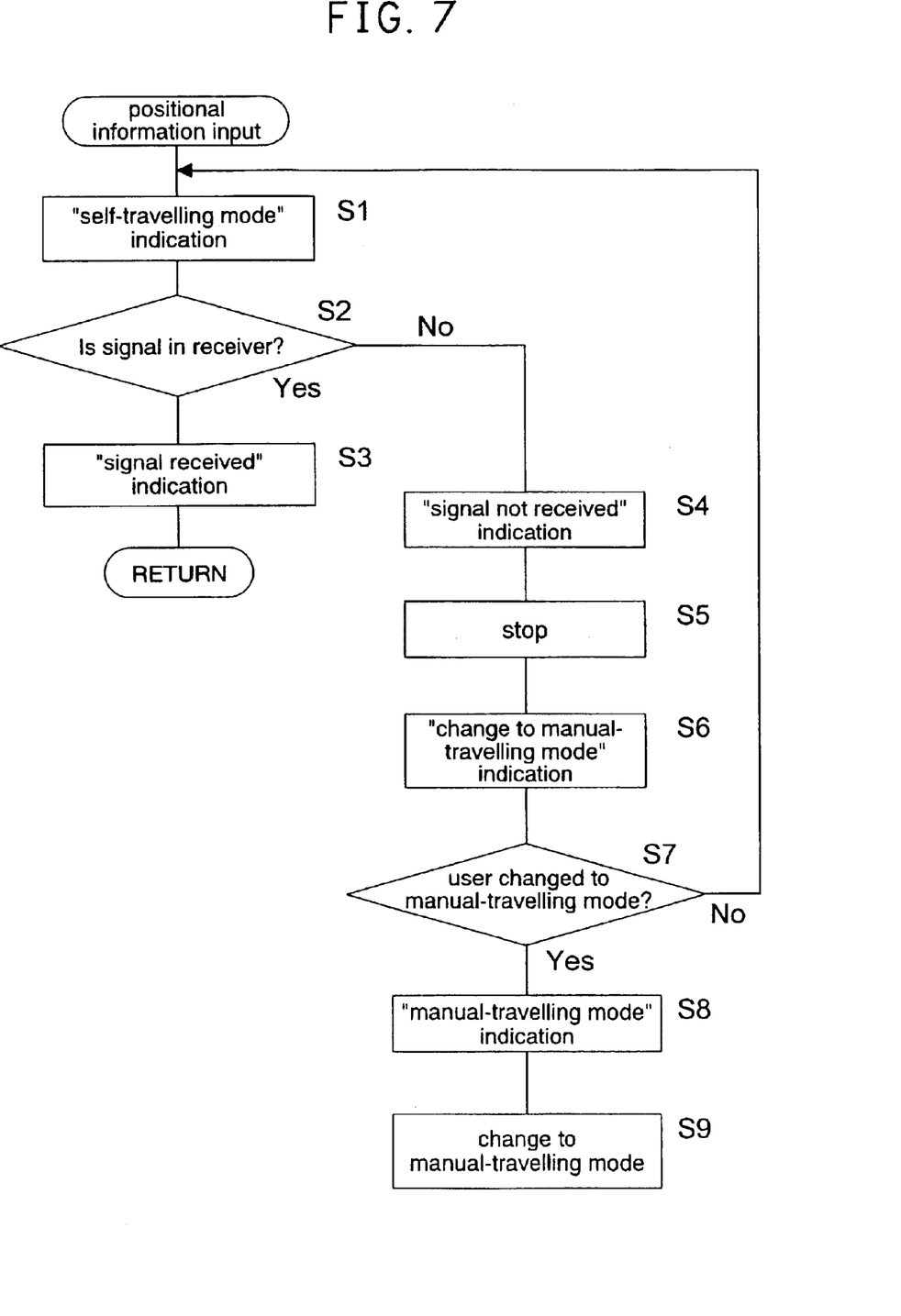
FIG. 7 is a flowchart showing traveling control operations corresponding to presence or absence of a signal from a receiving means in a case where self-traveling mode is selected according to an embodiment of the present invention.

Next, operations in self-traveling mode when electromagnetic wave from a satellite 13 cannot be received will be explained with reference to FIG. 7.

When positional information can be received, display 40 indicates that the cart travels in self-traveling mode (S1). And, whether a signal from a satellite 13 is transmitted from the receiver 36 to the MC 17 is detected (S2). When a signal from the satellite 13 is input, a display 40 indicates that a signal is received (S3), and self-traveling mode continues according to a flowchart shown in FIG. 4. However, when signals cannot be received by effect of weather or landform, or when signals is not received due to electrical breakage or short-circuit in the receiver 36, the display indicates that signal is not received (S4), and the travel is stopped (S5) due to an output signal from MC 17 to braking means 25. Then, the display 40 indicates that a user is prompted to change the cart to manual-traveling mode (S6). After that, it is detected whether the user changed the cart to manual-traveling mode (S7). Until the user changes to manual-traveling, the manual-traveling mode is not detected by a means of detecting self/manual traveling mode 30, procedure S1 continues. If the user changes the cart to manual-traveling mode, manual mode is detected (S7) by the means of detecting manual/self traveling mode 30, the display indicates that the cart is changed to manual-traveling mode (S8), then the cart is actually changed to manual-traveling mode (S9).

In the present embodiment, the cart is controlled so that the cart can not be changed to manual-traveling mode unless the user changes to manual-traveling mode. However, the cart may be changed automatically to manual-traveling mode, when signals cannot be received.

Operations after changing to manual-traveling mode when a signal from the receiver 36 is not received in the flowchart of FIG. 7, will be explained with reference to a flowchart shown in FIG. 8.

Figure 8:
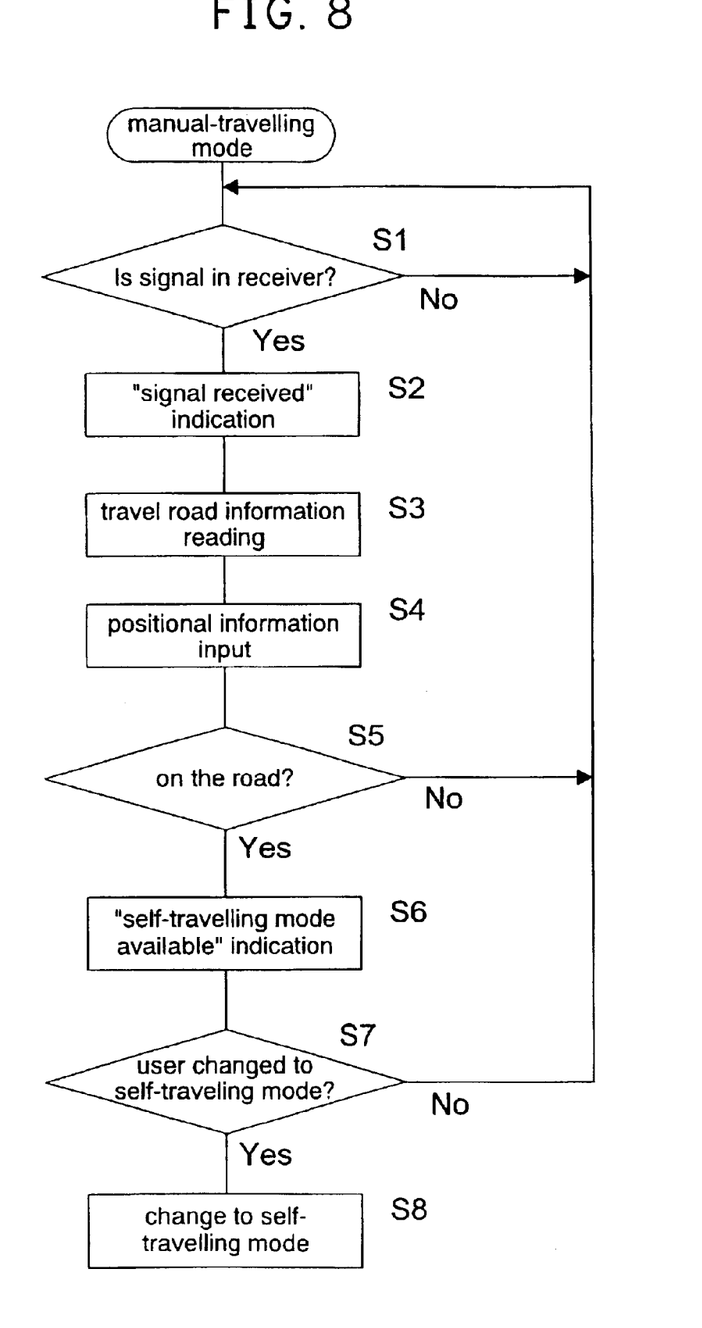
FIG. 8 is a flowchart showing travel control operations for switching from manual-traveling mode to self-traveling mode according to an embodiment of the present invention.

FIG. 8 shows a flowchart showing operations for switching from manual-traveling mode to self-traveling mode after a signal from the receiver 36 is again inputted. When a signal from the receiver 36 is inputted, a display 40 indicates that there exists a signal from the receiver 36 (S2). Then, based on reading of travel road (S3) and input of current positional information (S4), a decision whether a cart is on the predetermined road is made. Only when a cart is on the predetermined road, a display 40 indicates that a change to self-traveling mode is available (S6). After an input of switching signal to a self-traveling mode by a user, the cart is changed to self-traveling mode (S8).

According to the above-mentioned operations, a change to self-traveling mode is available only when the cart is on the predetermined road. Therefore, after a change to self-traveling mode, the cart can start to travel as it is, there is obtained an effect that a change in traveling mode can be done smoothly.

Figure 9:
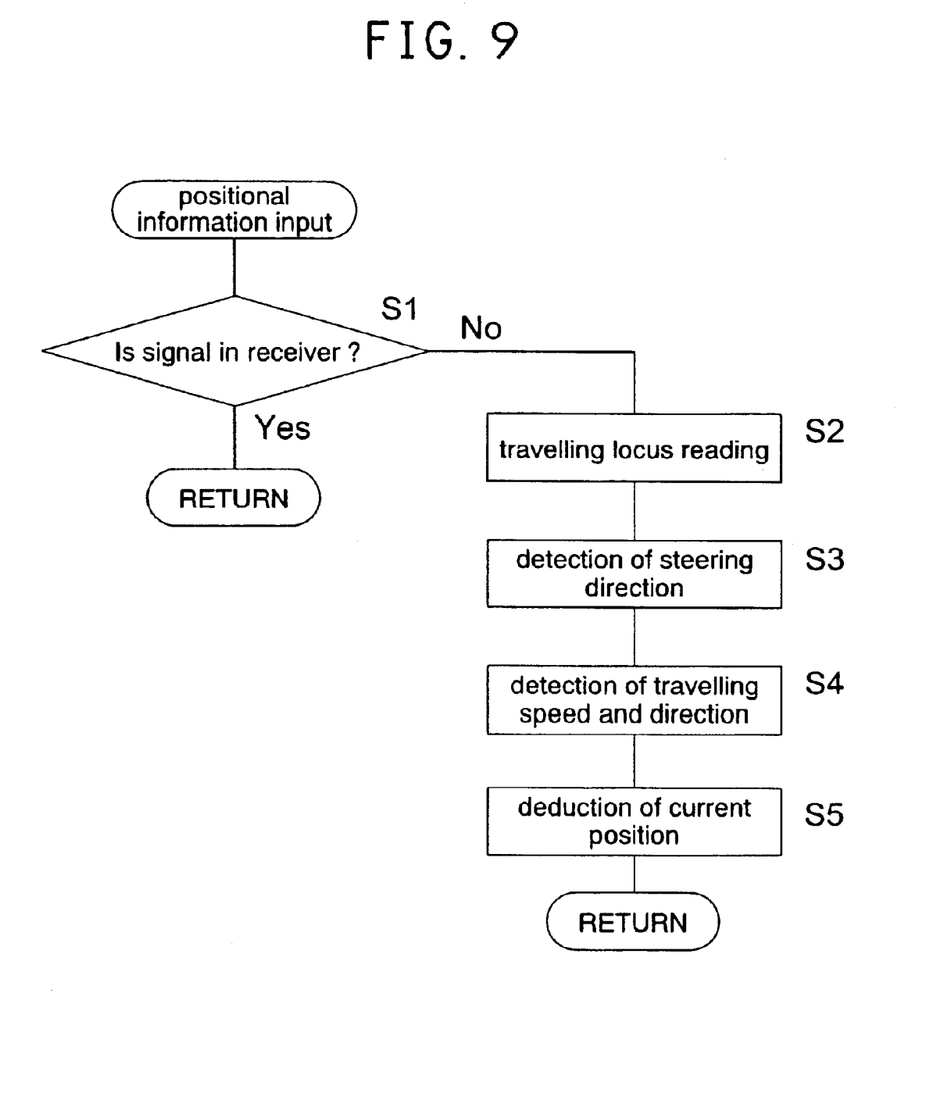
FIG. 9 is a flowchart showing alternative traveling control operations corresponding to absence of a signal from a receiving means in a case where self-traveling mode is selected according to an embodiment of the present invention.

Further, with reference to the FIG. 9, there will be explained alternative operations when a signal from the receiver 36 cannot be inputted due to a poor condition for receiving electromagnetic wave or a signal line breakage while traveling in self-traveling mode. After the travel locus is read out (S2), a virtual position after failing to detect the signal is prepared with use of means of detecting a steering direction 22 which detects steering direction of the steering wheel (S3) and use of means of detecting direction which detects travel direction of encoder 35 or the like (S4). By these operations, a current position can be deduced (S5), even if the signal from a satellite can not be received and the current position becomes unclear. Thus, the cart can continue to travel without stop.

While the preferred form of the present invention has been described, it is to be understood that modifications will be apparent to those skilled in the art without departing from the spirit of the invention.

What is claimed is:

1. Self-traveling vehicle comprising a traveling drive circuit for driving a drive source, a steering wheel drive circuit for operating a steering wheel and a receiving means for receiving signals of a positional information from a satellite, said self-traveling vehicle comprising, a calculating means for calculating current positional information based on the signals transmitted from the receiving means;

a storing means for storing a traveling road to be traveled, which is set beforehand;

a controlling circuit for controlling the traveling drive circuit and the steering wheel drive circuit in such a manner as to travel on a predetermined set road by verifying the current positional information calculated by the calculating means and the road to be traveled stored in the storing means;

wherein traveling directions to be traveled on said traveling road and a layout of a golf course are stored in said storing means;

wherein an information of said traveling road and a positional information calculated by said calculating means, both of which are stored in said storing means, are displayed on a display.

2. Self-traveling vehicle comprising a traveling drive circuit for driving a drive source, a steering wheel drive circuit for operating a steering wheel and a receiving means for receiving signals of a positional information from a satellite, said self-traveling vehicle comprising, a calculating means for calculating current positional information based on the signals transmitted from the receiving means;

a storing means for storing a traveling road to be traveled, which is set beforehand;

a controlling circuit for controlling the traveling drive circuit and the steering wheel drive circuit in such a manner as to travel on a predetermined set road by verifying the current positional information calculated by the calculating means and the road to be traveled stored in the storing means; and a braking means for braking a movement generated by said drive source and a detecting means for detecting a direction in which the self-traveling vehicle travels;

wherein said movement is braked by said braking means when the self-traveling vehicle travels in a direction opposite to a stored direction stored in said storing means after said direction is detected by the detecting means.

3. The self-traveling vehicle of claim 2, wherein said detecting means calculates a deviation departed from said stored direction based on a position of the self-traveling vehicle within a predetermined time period.

4. The self-traveling vehicle of claim 2, wherein said direction in which the self-traveling vehicle travels is detected by the detecting means using a traveling locus.

5. Self-traveling vehicle comprising a traveling drive circuit for driving a drive source, a steering wheel drive circuit for operating a steering wheel and a receiving means for receiving signals of a positional information from a satellite, said self-traveling vehicle comprising, a calculating means for calculating current positional information based on the signals transmitted from the receiving means;

a storing means for storing a traveling road to be traveled, which is set beforehand;

a controlling circuit for controlling the traveling drive circuit and the steering wheel drive circuit in such a manner as to travel on a predetermined set road by verifying the current positional information calculated by the calculating means and the road to be traveled stored in the storing means; and a detecting means for detecting a direction in which the self-traveling vehicle travels and a steering direction detecting means for detecting a direction in which said steering wheel is operated, wherein said positional information is prepared from the detecting means and the steering direction detecting means after failing to detect a positional signal to be transmitted if the positional information is not received by the receiving means, whereby the self-traveling vehicle travels based on the prepared positional information and the traveling road stored in the storing means.

6. Self-traveling vehicle comprising a traveling drive circuit for driving a drive source, a steering wheel drive circuit for operating a steering wheel and a receiving means for receiving signals of a positional information from a satellite, said self-traveling vehicle comprising, a calculating means for calculating current positional information based on the signals transmitted from the receiving means;

a storing means for storing a traveling road to be traveled, which is set beforehand;

a controlling circuit for controlling the traveling drive circuit and the steering wheel drive circuit in such a manner as to travel on a predetermined set road by verifying the current positional information calculated by the calculating means and the road to be traveled stored in the storing means; and a velocity detecting means for detecting a velocity of the self-traveling vehicle;

wherein the more said velocity increases, the more a frequency of reading said positional information from said calculating means implemented by the controlling circuit within a predetermined time period increases.

7. Self-traveling vehicle comprising a traveling drive circuit for driving a drive source, a steering wheel drive circuit for operating a steering wheel and a receiving means for receiving signals of a positional information from a satellite, said self-traveling vehicle comprising, a calculating means for calculating current positional information based on the signals transmitted from the receiving means;

a storing means for storing a traveling road to be traveled, which is set beforehand;

a controlling circuit for controlling the traveling drive circuit and the steering wheel drive circuit in such a manner as to travel on a predetermined set road by verifying the current positional information calculated by the calculating means and the road to be traveled stored in the storing means;

wherein the controlling circuit operates the steering wheel drive circuit using a forward position having a predetermined distance calculated by the calculating means as a target;

wherein said controlling circuit operates the steering wheel drive circuit using said forward position, wherein the more velocity increases, the farther said forward position is used as a target.

8. Self-traveling vehicle comprising a traveling drive circuit for driving a drive source, a steering wheel drive circuit for operating a steering wheel and a receiving means for receiving signals of a positional information from a satellite, said self-traveling vehicle comprising, a calculating means for calculating current positional information based on the signals transmitted from the receiving means;

a storing means for storing a traveling road to be traveled, which is set beforehand;

a controlling circuit for controlling the traveling drive circuit and the steering wheel drive circuit in such a manner as to travel on a predetermined set road by verifying the current positional information calculated by the calculating means and the road to be traveled stored in the storing means;

wherein said controlling circuit stops driving said drive source, when a signal from said receiving means is not received;

wherein there are switchably provided a self-traveling mode in which the vehicle travels through said controlling circuit and a manual traveling mode in which the vehicle travels with steering wheels manually operated by a user, wherein said controlling circuit switches to a manual-traveling mode if a signal from said receiving means is not received.

9. The self-traveling vehicle of claim 8, wherein there is provided a display indicating whether a signal from said receiving means is received or not.

10. The self-traveling vehicle of claim 8, wherein there is provided a display indicating a current traveling mode in which said vehicle travels.

11. The self-traveling vehicle of claim 8, wherein there is provided a display indicating whether a signal from said receiving means is received or not and a current traveling mode, wherein if a signal from said receiving means is not received, the display shows a signal from said receiving means is not received, then if a signal from said receiving means is received that a display shows that a signal from said receiving means is received and that a switch to self-traveling mode is possible.

12. The self-traveling vehicle of claim 11, wherein said display that a switch to self-traveling mode is possible is indicated only when said vehicle is on the pre-determined road.

* * * * *